United States Patent Office 2,842,534
Patented July 8, 1958

2,842,534
NITROGEN CONTAINING LIGNINS AND METHOD OF MAKING SAME

Joseph Bayne Doughty, Charleston, S. C., assignor to West Virginia Pulp and Paper Company, New York, N. Y., a corporation of Delaware No Drawing. Application February 20, 1956
Serial No. 566,746

1 Claim. (Cl. 260—124)

My present invention relates to reactions of lignin with ethyleneimine or substituents thereof and to the products of such reaction. These nitrogen containing lignins are valuable inter alia as fertilizers. Lignin, as is well known, is a major component of a humus added to soil by decaying plants, and the use of lignin as a soil additive has many times been proposed. While lignin is of definite value in this connection, both as a mulch for retaining moisture within the soil, and as a food for the biological processes which are continuously in operation in the soil, i. e. those involving micro-organisms such as bacteria, moulds and fungi, lignin itself is deficient in various elements required for plant growth, especially nitrogen.

I have now devised a new method of adding nitrogen to the lignin molecule, and in such a manner as will enable the nitrogen to be available as a plant food.

My improved process of making lignin containing nitrogen is based upon the reaction of ethyleneimine with lignin.

Ethyleneimine

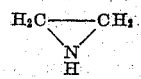

or the various substituted ethyleneimines

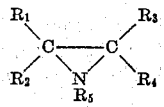

(in which $R_1$, $R_2$, $R_3$, and $R_5$ may each be a hydrogen atom, an aliphatic group, an aromatic group, any of the various substituted aliphatic or aromatic groups, or even a heterocyclic group) are very reactive compounds. With compounds containing an active or labile hydrogen atom (such as lignin), the ring structure of the ethyleneimines is broken and the two react to give an amine as illustrated by the two equations below:

(1) 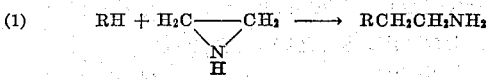

(2) 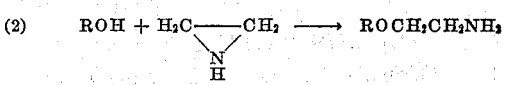

With compounds containing carboxyl groups, sulfonate groups (such as are contained in oxidized and sulfonated lignins), the ethyleneimine adds to the acid group as do other amines to give amine salts as shown by the equation below:

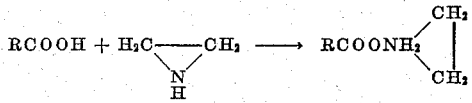

These salts like the ammonium salts are easily decomposed in aqueous acid solutions. The ethyleneimines are also known to form addition products with aldehyde and ketone compounds.

Solvent isolated lignins such as Braun's Native Lignin, lignins isolated from the black liquors of pulping operations, e. g. kraft and soda lignins and sulfite lignin compounds, acid hydrolysis lignins and other lignins are known to contain hydroxyl groups. The presence of these groups has definitely been established by the preparation of lignin esters and ethers. Further indicated are possible aldehyde or ketone groups as well as aromatic rings containing labile hydrogen atoms. Lignins from sulfite pulping operations contain sulfonic groups and those which have been subjected to oxidation procedures contain carboxyl groups. The entire structure of lignin has not yet been established.

It is therefore a principal object of my invention to devise new reactions of lignin with ethyleneimine or reactive substituents thereof, and to obtain new products of such reactions.

A still further object is to devise new methods of isolating the desired nitrogen-lignin compounds formed. Other objects of my invention and the advantages thereof will be evident as the description proceeds.

My invention will be more fully understood by reference to the following detailed description which includes various illustrative examples thereof.

The nitrogen containing lignins may be prepared from lignins from any of the known sources, e. g., wood, corn cobs, straw, bagasse, barks and other plant growth. The lignin used may be isolated from the plant material by any of the known methods, e. g., acid hydrolysis, from kraft, soda, solvent extraction, and others known to the art. Lignin sulfonic acids produced by the sulfite pulping of woody material may also be used as the starting material.

The reaction of the lignin with the ethyleneimine may be made to proceed by merely mixing the two materials together, lignin being soluble in the ethyleneimine. The reaction may also be carried out in the presence of any inert liquid which may serve as a diluent. The liquid may or may not be a solvent for the reactants. The reaction mixtures may be heated to increase the reaction rate, but I prefer to allow the reactions to take place at room temperature.

Because of the complex nature of lignin itself, the entire reaction of ethyleneimine with the lignin cannot be formulated. There is no doubt but that the ethyleneimine reacts with some and perhaps all of the hydroxyl groups of the lignin. The ethyleneimine may also react with a ketone group or a labile hydrogen atom on an aromatic ring of the lignin. Lignins which have been oxidized and contain a carboxyl group or sulfonated lignins containing a sulfonic group thus contain groups reacting with ethyleneimine.

In general the number of nitrogen groups added to the lignin molecule of the assumed weight of 840 may be varied by varying the concentration of the ethyleneimine present and by increasing the time allowed for the reaction or by varying both these factors.

*Example 1*

Three grams of Indulin A (commercial alkali lignin from kraft cooking liquors) was dissolved in 30 ml. of ethyleneimine. The solution was left standing at room temperature for eight days. The ethyleneimine-lignin solution was slowly and with good stirring poured into 450 ml. of ethyl ether to precipitate the reaction product. The precipitate was centrifuged from the ether solution and while in the centrifugal cup washed with four successive 50 ml. portions of ether. Two such washes were also made with petroleum ether, the last wash liquid being allowed to stand over night before centrifuging. Traces of wash liquors were removed under the vacuum of a water aspirator and the products dried over sodium hydroxide and sulfuric acid in a vacuum desiccator. The dry lignin product contained 8.5% nitrogen. The nitrogen containing lignin was insoluble or only slightly soluble in dioxane, pyridine, dioxolane, methyl cellusolve, 1:1 acetone-methanol, 1:1 acetone-dioxane, and methyl phosphate in which the Indulin A is completely soluble. Further, the nitrogen containing lignin is inherently insoluble in water at neutral or acid pH values but soluble in aqueous solutions of alkaline pH values. Said nitrogen derivatives, moreover, are difficultly hydrolizable. The nitrogen content of 8.5% indicates that seven mols of ethyleneimine have reacted with and become attached to each lignin unit of 840 g.

Example 2

In this example care was taken to insure that the lignin started with was free of attendant impurities and particularly sugars, tall oil or other black liquor impurities that might react with the ethyleneimine. Indulin A was first purified by preparing a 10% solution thereof in dioxane and this solution in turn was poured into ten times its volume of ethyl ether, thereby precipitating the lignin. The lignin so precipitated was then filtered and air-dried for 24 hours and then oven-dried at 105° C. to remove any solvents or moisture present, and this purification step using dioxane and ethyl ether followed by drying was repeated three times. One gram of the so purified lignin was then dissolved in 10 ml. of ethyleneimine and the solution allowed to stand at room temperature for six weeks. The solution was then poured slowly and with good stirring into 150 ml. of ethyl ether to precipitate the reaction product. The reaction product was recovered from the mixture by centrifuging and washed with four successive 50 ml. portions of ether, and then two such portions of petroleum ether. The wash liquors were removed under the vacuum of a water aspirator and the product was dried over sodium hydroxide and sulfuric acid in a vacuum desiccator. This product contained 9.3% nitrogen and had the same solvent solubility as the nitrogen containing lignin described in Example 1.

This product was further purified by dissolving 0.3 of a gram thereof in 40 ml. of a 1:1 mixture of methanol-nitro-methane. The solution was filtered and then poured slowly and with good stirring into 200 ml. of ethyl ether to precipitate the lignin. The nitrogen containing lignin was removed from the solvents by centrifuging and then washed with four successive 50 ml. portions of ether and two portions of petroleum ether. The lignin product was freed of solvent and dried as just described. This solvent extracted product contained 9.0% nitrogen. Its solubility remained unchanged. The analysis for nitrogen indicated that seven or more mols of the ethyleneimine had reacted with and become attached to each lignin unit of 840 g.

Example 3

One gram of Meadol (commercial alkali lignin from soda cooking liquors) was dissolved in 10 ml. of ethyleneimine and the solution left standing at room temperature for six weeks. The lignin product was precipitated from the imine into ethyl ether, centrifuged, solvent washed, and dried as described for the products in Example 2. This product contained 6.7% nitrogen. The nitrogen containing product was then dissolved in 1:1 nitromethane-methanol, precipitated into ether, centrifuged, solvent washed, and dried as described for the second product in Example 2. This solvent extracted product contained 6.6% nitrogen. Both of the products derived from Meadol had the same solvent solubilities described for the nitrogen containing product of Example 1. These nitrogen contents indicate that each five mols of ethyleneimine have reacted with and become attached to each lignin unit of 840 g.

Example 4

Indulin A (8.4 g.) was dissolved in 180 ml. of dioxane. To the solution was added drop-wise and with vigorous stirring, 3 ml. of ethyleneimine. As the ethyleneimine was added the lignin reaction product precipitated from solution. The mixture was allowed to stand at room temperature for four days. The reaction product was removed from the reaction mixture by centrifuging and then washed successively with four ml. portions of ether and two 50 ml. portions of petroleum ether. Traces of wash liquids were removed from the lignin by the vacuum of a water aspirator and then the product was dried over sodium hydroxide and sulfuric acid in a vacuum desiccator. This product contained 3.5 nitrogen and had similar solvent solubilities described for the product of Example 1. This nitrogen content indicates that two mols of ethyleneimine have reacted with and become attached to each lignin unit of 840 g.

Example 5

A 1.2 g. sample of the solvent extracted lignin used to prepare the nitrogen containing lignin of Example 2 was dissolved in 150 ml. of dioxane. To this solution was added 2 ml. of ethyleneimine. The lignin was completely precipitated at the end of the addition of the imine. The lignin was removed from the reaction mixture at once by centrifuging and then washed and dried as described for the product of Example 1. This lignin contained 2.9% nitrogen. This nitrogen content indicates that two mols of ethyleneimine have reacted with and become attached to each lignin unit of 840 g. It too, had the solvent solubilities described for the other nitrogen containing lignins.

In addition to serving as fertilizers, my improved compounds may also be used as starting materials for other lignin compounds.

It is understood that the examples hereinbefore set forth are illustrative only and that the invention as broadly described and claimed is in no way limited thereby.

I claim:

A nitrogen derivative of lignin obtained by the reaction of lignin with ethyleneimine, said derivative being characterized by being substantially insoluble in dioxane, pyridine, dioxolane, methyl cellusolve, 1:1 acetone-methanol, 1:1 acetone-dioxane, methyl phosphate, and water of neutral or acid pH, being soluble in water of alkaline pH, and being only difficultly hydrolyzable.

References Cited in the file of this patent

UNITED STATES PATENTS 2,508,430   Smith et al. _____ May 23, 1950

FOREIGN PATENTS 683,198   Germany _____ Nov. 1, 1939

OTHER REFERENCES

Brauns: Chemistry of Lignin, pp. 27–33, 94–98, 120–122 and 203–204 (1952 edition), published by Academic Press, Inc., New York.